United States Patent [19]

Hsu

[11] Patent Number: 4,724,620
[45] Date of Patent: Feb. 16, 1988

[54] AGGLOMERATION APPARATUS
[75] Inventor: Sheng-Hsiung Hsu, Marysville, Ohio
[73] Assignee: Nestec S.A., Vevey, Switzerland
[21] Appl. No.: 930,329
[22] Filed: Nov. 12, 1986

Related U.S. Application Data

[62] Division of Ser. No. 750,931, Jul. 1, 1985, Pat. No. 4,640,839.

[51] Int. Cl.⁴ .............................................. F26B 17/12
[52] U.S. Cl. ......................................... 34/174; 425/7; 425/10; 426/285; 34/225; 34/233
[58] Field of Search ............... 426/285, 456; 425/222, 425/7, 10; 34/174, 12, 13, 65, 225, 233

[56] References Cited

U.S. PATENT DOCUMENTS

| | | |
|---|---|---|
| 2,893,871 | 7/1959 | Griffin . |
| 2,977,203 | 3/1961 | Sienkiewicz et al. . |
| 2,995,773 | 8/1961 | Gidlow et al. . |
| 3,143,428 | 8/1964 | Reimers et al. . |
| 3,212,908 | 10/1965 | Childs et al. . |
| 3,424,589 | 1/1969 | Kan et al. . |
| 3,485,637 | 12/1969 | Adler et al. . |
| 3,554,760 | 1/1971 | Sienkiewicz et al. . |
| 3,622,081 | 11/1971 | Marsh . |
| 3,652,293 | 3/1972 | Lombana et al. . |
| 3,695,165 | 10/1972 | Sienkiewicz et al. . |
| 3,716,373 | 2/1973 | Rhodes et al. . |
| 3,727,839 | 4/1973 | Marsh . |
| 3,804,963 | 4/1974 | Sienkiewicz et al. . |
| 3,947,166 | 3/1976 | Kleemann et al. . |

FOREIGN PATENT DOCUMENTS

| | | |
|---|---|---|
| 1111366 | 4/1968 | United Kingdom . |
| 1267930 | 3/1972 | United Kingdom . |

Primary Examiner—Larry I. Schwartz
Attorney, Agent, or Firm—Vogt & O'Donnell

[57] ABSTRACT

A pulverulent, water-soluble material is agglomerated by projecting the material in a stream through a moistening zone. Means are provided for directing an aqueous gas towards the stream of particulate material in the moistening zone so that the stream of particulate material is surrounded by and confined throughout its path of travel through the moistening chamber as particles of the particulate material are moistened and fused, and means are provided for drying the material. Means are also provided for feeding a cooling gas and/or a stream of steam adjacent to and about the periphery of the stream of material.

16 Claims, 5 Drawing Figures

AGGLOMERATION APPARATUS

This is a divisional application of application Ser. No. 06/750,931, filed July 1, 1985, now U.S. Pat. No. 4,640,839.

The present invention relates to treatment of particulate materials.

Particulate comestible materials such as soluble or "instant" coffee are commonly agglomerated to adjust particle size, bulk density, and other properties. The material to be agglomerated typically is exposed to a vigorous, turbulent jet of steam. As the steam condenses, it moistens and heats the particles so that they are covered with a sticky coating of soft, wet material. When coated particles contact one another in the turbulent environment, they adhere to one another and the coatings on contiguous particles merge. Upon drifting, the merged coatings solidify and form welds between adjacent particles.

Procedures of this type ordinarily produce agglomerates having smooth, rounded edges and a sponge-like texture. Ordinarily, the surfaces of the particles must be thoroughly wetted by the steam to provide satisfactory agglomeration. Such thorough wetting has a characteristic, typically uniform effect on the color of the product. In the case of coffee, the agglomerates typically have a uniform dark color.

Such a product does not look like roast and ground coffee. Roast and ground coffee incorporates sharp-edged flakes of variegated color, primarily dark but with some lighter spots. Consumers associate the roast and ground appearance with flavor quality. Accordingly, there has been a need for improved control of particle shape and appearance in agglomeration of soluble coffee and other products.

Also, the traditional agglomeration processes typically consume large quantities of steam and cause loss of fugitive flavor constituents from the agglomerated material. There has accordingly been need for processes and apparatus which alleviate those deficiencies.

SUMMARY OF THE INVENTION

The present invention provides processes and apparatus which address those needs.

In processes according to the present invention, the particulate material is projected in a stream through a moistening zone. An aqueous gas is directed towards the stream from outside the periphery of the stream so that aqueous gas flowing inwardly towards the center of the stream surrounds the stream. The term "aqueous gas", as used in this disclosure, includes steam and aerosols of fine water droplets dispersed in steam or in another gas. The aqueous gas moistens the particles, forming a liquid or quasi-liquid phase at the particle surfaces. Colliding or contiguous particles are joined to one another by fusion of their respective liquid or quasi-liquid phases, thereby forming agglomerates. The agglomerates are then dried to solidfy the fused phases and preferably fragmented to the desired size.

Although the present invention is not limited by any theory of operation, it is believed that the inwardly-flowing aqueous gas tends to confine the stream of particulate material within a relatively small volume, thereby maximizing the number of particles per unit volume or "particle population density" in the stream. It is believed that the relatively high particle population density prevailing in the stream increases the probability of contact between particles in the moistening zone, and hence increases the probability of fusion between particles. The aqueous gas flowing inwardly preferably has a relatively low velocity, and does not create significant turbulence. It is believed that under the relatively quiescent conditions prevailing in the moistening zone, the particles contact one another at low relative velocities, further increasing the probability of fusion. Preferably, at least the major portion of the aqueous gas is introduced into the moistening zone with zero component of velocity in the direction parallel to the particle path. Because the aqueous gas does not appreciably accelerate the particles along the path, the residence time of the particles in the moistening zone is maximized, further promoting fusion of the particles.

According to a further aspect of the invention, the particles may be engaged with one another to form chunks before the moistening step, as by compacting the material. The chunks are projected in the stream of particulate material and contacted with the aqueous gas in the moistening zone. Under relatively quiescent conditions prevailing in the moistening zone, the chunks are not broken apart completely into individual particles. Rather, at least some of the original chunk structure survives the moistening step. The particles in each surviving chunk remain in contact with one another through the moistening step, and fuse efficiently upon moistening to form agglomerates.

The process conditions in the moistening step may be selected either to provide thorough wetting of all particles in each chunk, and hence a uniform darkening effect, or to provide thorough wetting of particles at the exterior surfaces of the chunks but incomplete wetting of particles at the interiors of the chunks. Such nonuniform wetting provides agglomerates with a dark exterior and a light interior. Upon subsequent fragmentation, the light interior portions are exposed and form light specks resembling those in roast and ground coffee.

It is believed that retention of chunk structure during the moistening step aids in flavor retention. Although the present invention is not limited by an theory of operation, it is believed that flavor loss from the particles on the interior of each chunk is minimized by the shielding effect of the surrounding particles.

The preferred agglomeration processes according to the present invention permit control of product texture or particle shape, color and density to achieve substantially any desired combination of these properties within extremely broad ranges. Thus soluble coffee may be agglomerated to provide either sharp-edged granules resembling roast and ground coffee particles or spongy particles resembling conventionally agglomerated products with any color from a light tan to a dark brown verging on black, and any bulk density from about 17 gm/dl to about 30 gm/dl. Moreover, if steam is employed as the aqueous gas, agglomeration processes according to the present invention typically can agglomerate the material with lower rates of steam application than the steam-jet processes utilized heretofore. Such lower steam rates tend to minimize losses of volatile flavor and aroma constituents from the material.

The particle size of the treated material has a significant influence on the results achieved. Particles smaller than about 50 microns facilitate formation of chunks prior to moistening. Treatment of such small particles by the present processes, with or without the preliminary chunk formation step, tends to provide an agglomerated product with a sharp-edged, granular texture. Larger particles, up to about 200 microns, tend to provide a spongy texture. With still larger particles, the degree of agglomeration falls off markedly. Very large particles may be treated according to the present processes to darken them without appreciable agglomeration.

The present invention also provides improved apparatus for treating a particulate material. Apparatus according to this aspect of the present invention may incorporate means for projecting a stream of the material along a path in a downstream direction, means for supplying an aqueous gas so that the aqueous gas flowing inwardly towards the path surrounds the stream, and means for drying the material. The apparatus may also include means for engaging particles with one another to form chunks and means for fragmenting the material after moistening.

The foregoing and other objects, features and advantages of the present invention will be more fully apparent from the detailed description of the preferred embodiments set forth below taken in conjunction with the accompanying drawings.

DETAILED DESCRIPTION OF THE PREFERRED EMBODIMENTS

Figure 1:
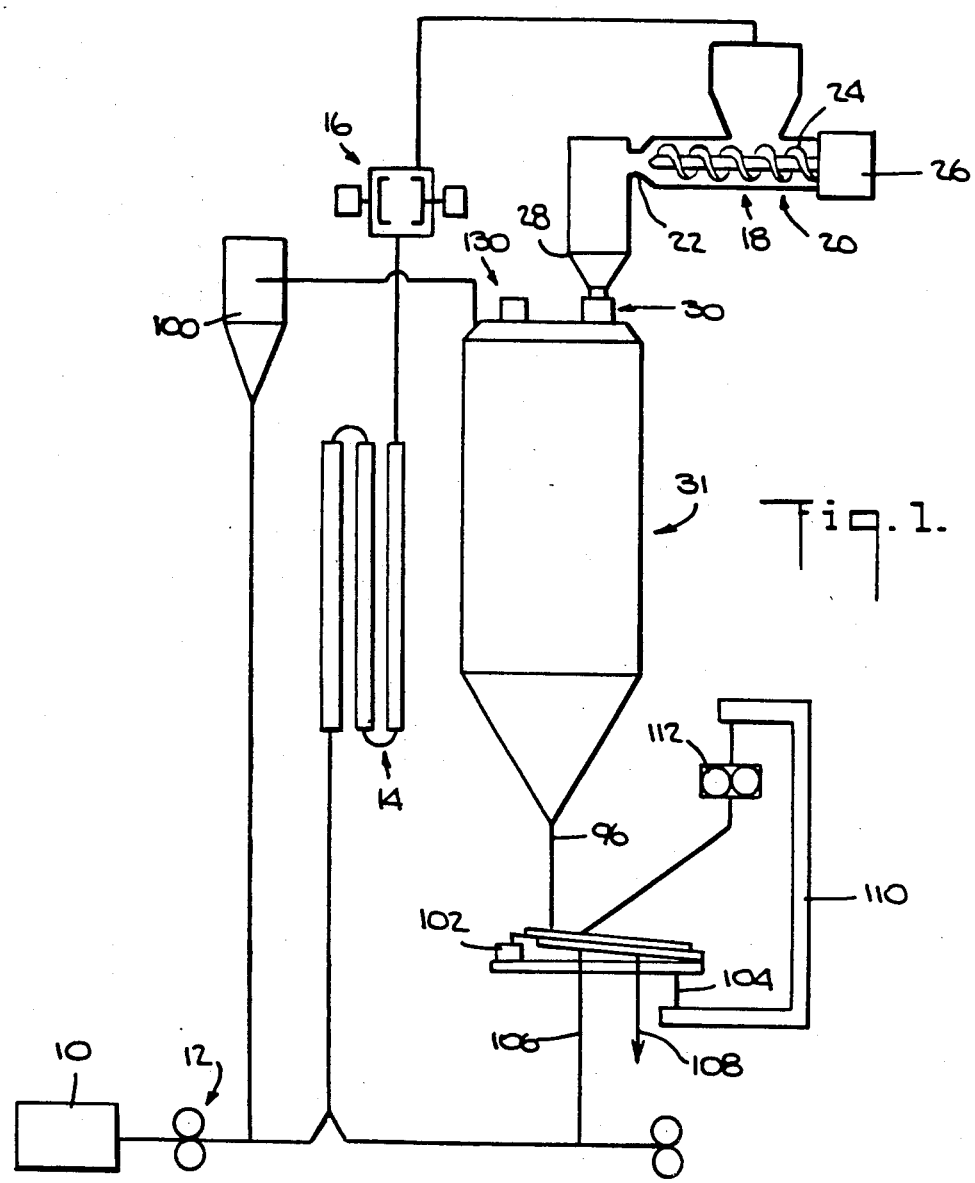
FIG. 1 is a schematic diagram of apparatus according to one embodiment of the present invention.

The apparatus illustrated in FIG. 1 includes a feed hopper 10 connected through a pneumatic fluidizing and conveying system 12 and a heat exchanger 14 to a pulverizer 16, which in turn is connected to a feeding device 18. This device includes a tubular casing 20 having an orifice 22 at its outlet end and a screw-like auger 24 mounted for rotation within the casing. Auger 24 is connected to a variable speed motor 26.

Figure 2:
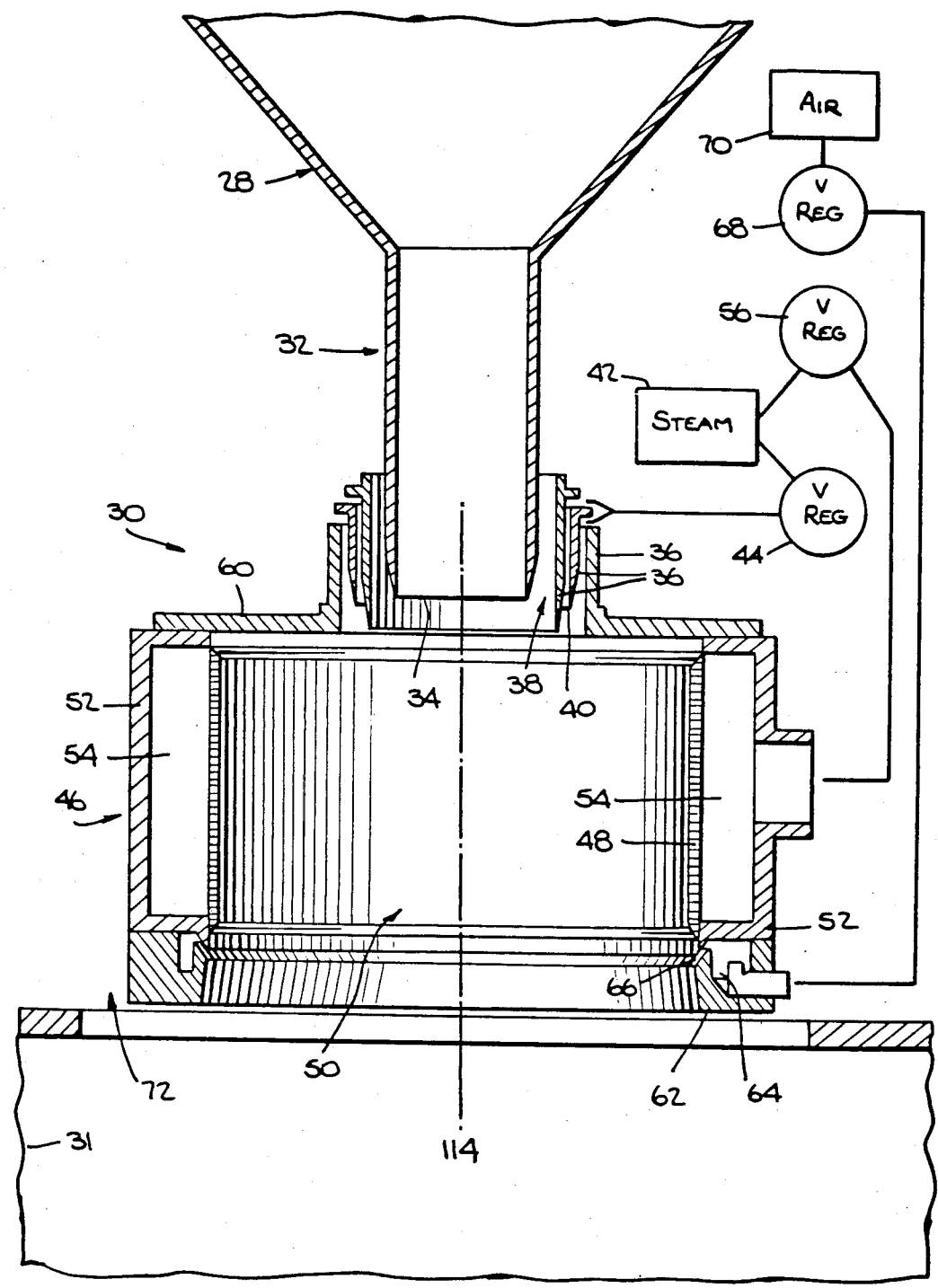
FIG. 2 is a fragmentary schematic sectional view, on an enlarged scale, of the apparatus illustrated in FIG. 1.

Orifice 22 is connected to the feed inlet hopper 28 of a nozzle assembly 30 which is mounted atop the chamber 31 of a dryer. As shown in FIG. 2, nozzle assembly 30 incorporates a cylindrical feed tube 32 connected to the bottom of hopper 28, the feed tube having a circular feed orifice 34 at its lower or downstream end. The top of hopper 28 is open to the atmosphere.

A plurality of nozzle rings 36 are mounted coaxially with the feed tube so that the nozzle rings surround the lower end of the feed tube and extend slightly downstream of feed orifice 34. The innermost nozzle ring and the wall of the feed tube cooperatively define an annular gap 38 which is open to the atmosphere. The nozzle rings cooperatively define a pair of annular steam orifices 40, which are connected to a steam source 42 via an adjustable pressure regulating valve 44. Other appropriate devices (not shown) may also be provided for monitoring and controlling the flow rate, pressure and temperature of steam supplied to the orifices, and for removing condensate from the steam.

A diffuser assembly 46 is mounted below the nozzle rings and feed tube. The assembly incorporates a porous cylindrical shell or collar 48 of sintered stainless steel coaxial with feed tube 32, the collar defining a moistening chamber 50 beneath the feed tube.

The collar has a vast number of microscopic pores extending through it, such pores being uniformly distributed over the surfaces of the collar. Wall structure 52 defines an annular channel 54 surrounding the collar and confronting the exterior surface of the collar around its entire circumference. The annular channel is connected via an adjustable regulating valve 56 to steam source 42, and additional monitoring and control instrumentation (not shown) may be provided for controlling steam conditions within the annular channel, and for removing condensate from the steam. A top wall 60 connects wall structure 52 with the outermost nozzle ring 36, so that the top or upstream end of moistening chamber 50 is closed but for the feed tube, annular gap and steam orifices.

An aspirator ring 62 is mounted immediately below wall structure 52. An annular slot 64 in the aspirator ring is connected to a narrow, inwardly and downwardly directed annular aspirator nozzle 66 adjacent the lower or downstream end of collar 48, the annular nozzle being coaxial with the collar. Slot 64 is connected via an adjustable regulator 68 to a source of compressed air 70.

Nozzle assembly 30 is mounted atop the dryer chamber 31 and aligned above an opening in the top wall of the chamber, there being a clearance 72 between the exterior of the nozzle assembly and the edges of the opening. The dryer chamber may be the chamber of a conventional dryer known in the trade as a top-inlet dryer. Such a dryer includes appropriate conventional equipment (not shown) connected to the chamber for heating air and drawing the heated air through the chamber. The air handling equipment is arranged to maintain the interior of the chamber at a slight subatmospheric pressure. A product outlet 96 (FIG. 1) is provided adjacent the bottom of the chamber. A dust collector 100 is arranged to capture fine particles from the air exiting the chamber, and to feed the collected particles back into pneumatic conveying system 12.

The product outlet 96 of the dryer chamber is connected to a conventional screening device or classifier 102, arranged to segregate incoming material by size. The classifier has an overs outlet 104 for discharge of oversize particles, an unders outlet 106 for discharge of undersized particles and a product outlet 108 for discharge of material in the desired intermediate size range. A device such as a fluidized bed contactor (not shown) may be connected to the product outlet for cooling the discharged product. Unders outlet 106 is connected to conveying system 12. The overs outlet is connected via an elevating conveyor 110 to fragmentizer 112, which in turn is arranged to discharge back into the inlet of the classifier. The fragmentizer may incorporate a pair of opposed parallel shafts, each having a plurality of disk-like toothed blades mounted thereon, the blades on each shaft extending between the blades on the opposing shaft. An appropriate drive (not shown) is provided for spinning the shafts so that material passing into the fragmentizer is engaged between blades on opposing shafts.

In one process according to the present invention, particles formed by spray drying an aqueous extract of roast coffee are passed from feed hopper 10 through heat exchanger 14 to pulverizer 16. Minute particles are fed from the pulverizer into feeding device 18. Auger 24 is rotated by motor 26 to advance the particles downstream through orifice 22.

The material passes downwardly from orifice 22 through feed inlet hopper 29 to the feed tube 32 of nozzle assembly 30 (FIG. 2) and drops through feed orifice 34 at the bottom of the tube. Thus, a stream of particulate material having a generally circular cross-section and a diameter approximately equal to the diameter of feed orifice 34 is projected from the feed orifice in a downward or downstream direction on a generally vertical path along the extended axis 114 of the feed tube. Steam source 42 and regulating apparatus 56 maintain annular channel 54 under a predetermined steam pressure. Steam diffuses through the wall of collar 48, and flows inwardly toward axis 114, forming a cloud in moistening chamber 50. As the particles encounter the steam, some of the steam condenses on the particles.

Because annular channel 54 offers no appreciable resistance to flow of steam, and the annular channel confronts the collar over its entire circumference, the collar is exposed to substantially uniform steam pressure over its entire circumference. As the collar is of substantially uniform porosity, steam diffuses through the collar at a substantially uniform rate over its entire circumference and enters moistening chamber 50 at a uniform, low velocity in the radial direction towards axis 114. Steam passing through the collar flows from the collar surface in the direction normal to the collar surface, and hence has substantially zero velocity in the upstream-to-downstream direction parallel to the axis.

Steam supplied to orifices 40 under a very low pressure via regulating apparatus 44 passes downstream from the orifices at a subsonic velocity adjacent the stream of particles, and blends with the cloud, providing additional water for moistening the particles.

The steam issuing from the steam orifices prevents the cloud from spreading upstream, and also induces a downstream flow of relatively cool ambient air through annular gap 38 and through the open-tapped hopper 28 and feed tube 32. The air cools the feed tube and prevents steam from entering the feed tube. This in turn prevents material in the feed tube from adhering to the walls of the tube. As the cool air passes downstream into the steam cloud, it promotes condensation of steam on the particles.

Compressed air passes from annular slot 64 in the aspirator ring through annular nozzle 66 and moves downwardly or downstream with a significant velocity parallel to axis 114. As the air is discharged at a uniform rate all around the axis, the air does not tend to deflect the particles transversely of the axis. The downstream flow of the air from the annular nozzle entrains particles and gases adjacent the downstream edge of chamber 50 and impels them downstream into dryer chamber 31.

As the particles pass downstream through the moistening chamber, the moisture condensed on the particles blends with and dissolves the solids at the particle surfaces. At the same time, heat transferred from the steam to the particles raises the temperature of the material. Both of these effects contribute to formation of a liquid or quasi-liquid flowable phase at the surfaces of the particles. As the particles collide with one another, the flowable phases on the surfaces of the colliding particles merge with one another, thereby fusing the particles into agglomerates.

As the agglomerates enter dryer chamber 31, they encounter a mixture of ambient air drawn into the dryer chamber through clearance 72 and hot, dry air supplied by the air handling equipment incorporated in the dryer. The agglomerates give up the water from the flowable phase, leaving the particles within each agglomerate welded to one another by solid material from the flowable phase. The dried agglomerates exit from the chamber through outlet 96 (FIG. 1) and pass to classifier 102. Oversize agglomerates are directed through elevator 110 to fragmentizer 112, where they are broken into pieces. The pieces are directed back to classifier 102. Agglomerates and pieces in the desired size range pass from the system through product outlet 108. Undersized agglomerates and pieces pass back to conveyor 12, where they are reintroduced into the process along with fresh feed material. Fine particles recaptured by dust collector 100 from the air exiting the dryer are reintroduced into conveyor 12 for recycling through the process.

The agglomeration process may be enhanced by engaging some or all of the particles with one another to form chunks in a preliminary step, before the material enters the moistening chamber. Chunk formation as referred to herein typically does not involve fusion of the particles with one another, but instead employs the natural tendency of minute particles to adhere to one another. This tendency increases as the size of the particles decreases; particles less than about 100 microns, and more preferably less than about 50 microns in size provide the most satisfactory preliminary chunk formation.

Preliminary chunk formation may be promoted by compacting and/or humidifying the particulate material before it is fed to the moistening chamber. Thus, the diameter of the restricted orifice 22 of the feeding apparatus 18 (FIG. 1) and the flow rate of the particulate material may be selected so that the material is compacted as it passes through the orifice.

Humidification of the material to promote chunk formation preferably does not entail exposure of the particles to liquid water or an aqueous gas. Air at about 60–80% relative humidity may be contacted with the particulate material to adjust its moisture content. Preferably, the particles have moisture content between about 2% and about 8% by weight when formed into chunks; about $3\frac{1}{2}$% to about $4\frac{1}{2}$% is more preferred, and about 4% moisture is most preferred. Chunks may also be formed without compaction in ordinary handling and conveying operations, especially if particle size and moisture content favor chunk formation.

Chunks formed prior to the moistening step pass into the moistening chamber in the stream of particulate material, and are moistened by the steam in the chamber. The particles constituting each chunk are already in contact with one another. Upon moistening, a flowable phase forms at the interstices between the particles in each chunk, thereby fusing the particles in the chunks into agglomerates. Chunks may also fuse with one another, with individual particles and with agglomerates previously formed from individual particles.

There may also be some attrition of chunks prior to fusion. However, the relatively quiescent conditions prevailing in the moistening chamber tend to minimize any such attrition. Those conditions which favor chunk formation—small particle size, compaction and humidification—also tend to provide stronger chunks which resist attrition. Preferably, the process conditions are selected so that at least some of the chunk structures survive, i.e., so that at least some of the particles bound to one another in the chunks remain bound through the moistening step and hence are bound to one another in the agglomerates entering the dryer chamber.

Whether or not chunks are formed prior to the moistening step, the appearance and density of the final product varies with the degree of moistening achieved during passage through the cloud of aqueous gas. Greater moistening tends to produce a darker and slightly denser product. Preliminary chunk formation, however, affords additional opportunity for control of product appearance. With relatively high moistening, all of the particle surfaces in each chunk are wetted and hence the product is darkened uniformly. Limited moistening provides uneven wetting within each chunk, the particle surfaces at the interiors of the chunks being less wetted and hence lighter in color than those at the exteriors of the chunks. The light-colored interiors are exposed upon fragmentation, thereby providing the product with a nonuniform speckled appearance.

The degree of moistening varies directly with the duration of exposure of the chunks to the cloud and directly with the moisture content of the cloud.

The moisture content of the cloud depends directly upon the steam flow supplied to the cloud and is controlled principally by the steam flow rate through the diffuser. Steam flow rates through the diffuser or collar up to about 100 kg per minute per square meter of diffuser surface are preferred, and rates between about 5 to 50 kg per minute per square meter of diffuser surface are more preferred. Steam entering the moistening chamber at such relatively low flow rates per unit area does not create substantial turbulence. For soluble coffee, the total steam flow rate through the diffuser typically is about 0.9 to about 2.4 kg per minute per liter of moisture chamber volume, and about 0.25 to about 0.50 kg per kg of particulate material processed.

The duration of exposure varies directly with the length of the particle path through the cloud and hence with the length of the moistening chamber in the direction parallel to the path. Moistening chambers between about 2.5 cm and about 20 cm long and about 5 cm to about 25 cm diameter are preferred.

The duration of exposure varies inversely with the downstream component of velocity of the gases within the moistening chamber. The downstream component of velocity depends in turn on the combined effect of the steam and air entering through the steam orifices and the annular gap surrounding the feed orifice.

Steam supplied through the steam orifices tends to accelerate the chunks downstream, thereby decreasing the degree of moistening achieved. Also, excessive steam velocities may cause undesired turbulence and excessive attrition of the chunks. Accordingly, it is preferred to supply the steam through the orifices at the minimum velocity needed to prevent the steam cloud from spreading upstream into the feed orifice. Velocities on the order of 10 meters/second may be employed. Such low velocity, subcritical steam flow may be achieved by supplying steam to the orifices at a pressure less than about 9 kPa and more preferably less than 4 kPa above the pressure in the moistening chamber. Typically, the pressure in the chamber is close to atmospheric.

The air flow into the moistening chamber around and through the feed tube preferably is the minimum required to keep the feed tube cool and dry. Air velocity of about 1 meter per second through the annular gap surrounding the feed tube typically is satisfactory. Ordinarily, the air velocity through the feed tube is less than the air velocity through the annular gap.

The steam passing through the porous diffuser or collar does not influence the downstream velocity component appreciably, and hence the rate of steam flow through the collar may be adjusted without appreciably altering the residence time of the particles in the moistening chamber. By varying the rate of steam flow through the collar, the water vapor concentration or humidity within the chamber may be adjusted as desired to moisten the particles to the desired extent. The steam flow through the diffuser may be varied without adversely altering any other aspect of the operation. Thus, steam supplied through the diffuser does not tend to entrain air. Whatever the steam flow rate through the diffuser, the only air entering the moistening chamber will be deliberately introduced around and through the feed orifice. This is a significant advantage, inasmuch as excess air can interfere with the moistening action of a steam cloud.

The steam entering the moistening chamber through the diffuser has a radial component of velocity, directed inwardly towards the axis of the stream. Thus, at least adjacent the periphery of the chamber, there is inward flow as well as a downstream flow. The stream of particles issuing from the feed orifice is thus surrounded by steam flowing inwardly, towards the center of the stream from outside the periphery of the stream. The inward flow of steam tends to confine the particles and maintain a relatively narrow stream of particles closely surrounding the axis. Such confinement keeps the particles away from the collar and hence prevents accumulation of solid material on the collar. It is believed that confinement of the particles into a narrow stream tends to maintain a relatively high number of particles per unit volume or particle population density within the stream, thereby increasing the probability of collisions between particles in the stream and promoting agglomeration. If the chunks formed in a preliminary step are present in the stream, the probability of collisions between chunks, and the probability of collisions between individual particles and chunks, also are increased, thus further promoting agglomeration.

If a product having a granular texture resembling roast and ground coffee or resembling the texture of typical commercial freeze-dried soluble coffee is desired, the particles used in the process should be smaller than about 40 micron mean size. A distinct transition occurs at the 40–50 micron range; with particles larger than about 50 micron mean size, the product tends to have a spongy texture, similar to that of materials agglomerated by conventional processes. With particles smaller than about 40 micron mean size, the product has a granular texture; it is believed that smooth-surfaced agglomerates form upon moistening and drying, and are broken into sharp-edged granules during fragmentation. Although the present invention is not limited by any theory of operation, it is believed that the inwardly-flowing aqueous gas contributes to formation of the smooth-surfaced agglomerates.

Particle size mentioned in this disclosure refers to the mean particle size of the material as determined by light-scattering techniques using a MICROTRAC ™ particle size analyzer, sold by the Leeds & Northrup Instruments unit of General Signal Corporation, or another instrument of like characteristics. Particles of the desired size typically are obtained by pulverizing or milling larger particles.

The process conditions referred to above may be adjusted to provide many different combinations of product properties. Thus, a dark product of low density may be made by using relatively large particles with low or no compaction, and a relatively high degree of moistening. A relatively light-colored product of high density may be made by combining small particle size, chunk formation with high compaction and low moistening, whereas a dark, high-density product may be made with the same particle size and compaction but higher moistening. When employed with soluble coffee, the present process can provide products resembling commercial freeze-dried granules, or roasted and ground coffee particles, or conventionally agglomerated coffee with any desired bulk density between about 17 gm/dl and about 30 gm/dl. Ordinarily, such varied products can be produced without any modification of the apparatus.

Figure 3:
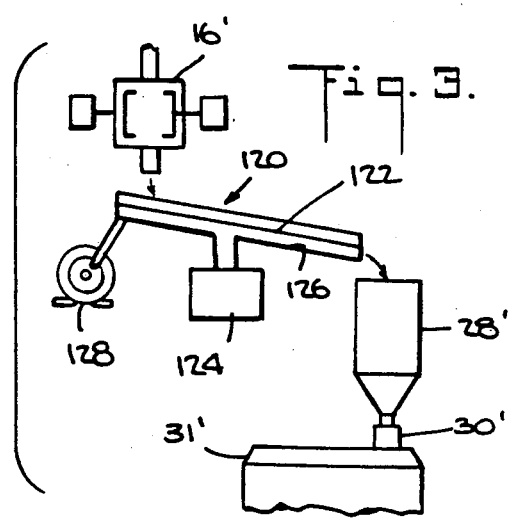
FIG. 3 is a fragmentary schematic view of apparatus according to a second embodiment of the present invention.

In apparatus according to a further embodiment of the present invention, partially illustrated in FIG. 3, the pulverizer 16' feeds into a trough 120 having a porous floor 122. Humidified air under pressure supplied by air handling unit 124 to chamber 126 beneath floor 122 blows upwardly through the porous floor. A vibration generator shakes the trough gently so that material introduced into the trough from the pulverizer moves along the porous floor. The moving particles encounter the humidified air and alos become engaged with one another to form chunks which pass into the feed hopper 28' and thence through the nozzle assembly 30' and dryer 31' for processing as described above. The conveying and humidifying apparatus thus forms the chunks without compaction. If the feed material supplied to the process has appropriate moisture content, ordinary conveying apparatus without humidification equipment can provide adequate engagement. Although vibration may be used to form chunks in this fashion, it should be noted that extremely vigorous vibration can have the opposite effect, and can cause chunks to disintegrate. In a further variant, humidifying and conveying apparatus may be combined with compaction apparatus. Thus, a humidifying vibrating conveyor as illustrated in FIG. 3 may be interposed between the pulverizer 16 and the inlet to the auger-type device 18 of the apparatus illustrated in FIG. 1.

The apparatus and processes described above may be modified in many other ways without departing from the present invention. For example, the classifying and fragmenting operations may be omitted, and the product taken directly from the outlet of the dryer. The fine particles from the classification operation need not be recycled as described, but may instead be used in other ways.

In a further variant, the same dryer may be utilized simultaneously both for the agglomeration process referred to above and for drying a liquid material. While the material to be agglomerated is fed through the nozzle assembly 30 (FIG. 1) fine droplets of the liquid material may be projected into the interior of the dryer via a conventional spray drying nozzle 130. Typically, the spray-dried particles formed from such liquid are significantly smaller than the agglomerates. A significant portion of the spray-dried particles are entrained in the moving air within the drier, captured by dust collector 100 and fed to conveying system 12. The other spray-dried particles are separated from the dried chunks in classifier 102 and pass through unders outlet 106 back to the conveying system. Thus, the spray-dried particles pass into the agglomeration process via pulverizer 16. In a further variant, the classifier may be arranged to retain some spray-dried particles with the dried chunks in the final product exiting through outlet 108, thereby to provide a product incorporating a mixture of different particle sizes and textures.

Figure 4:
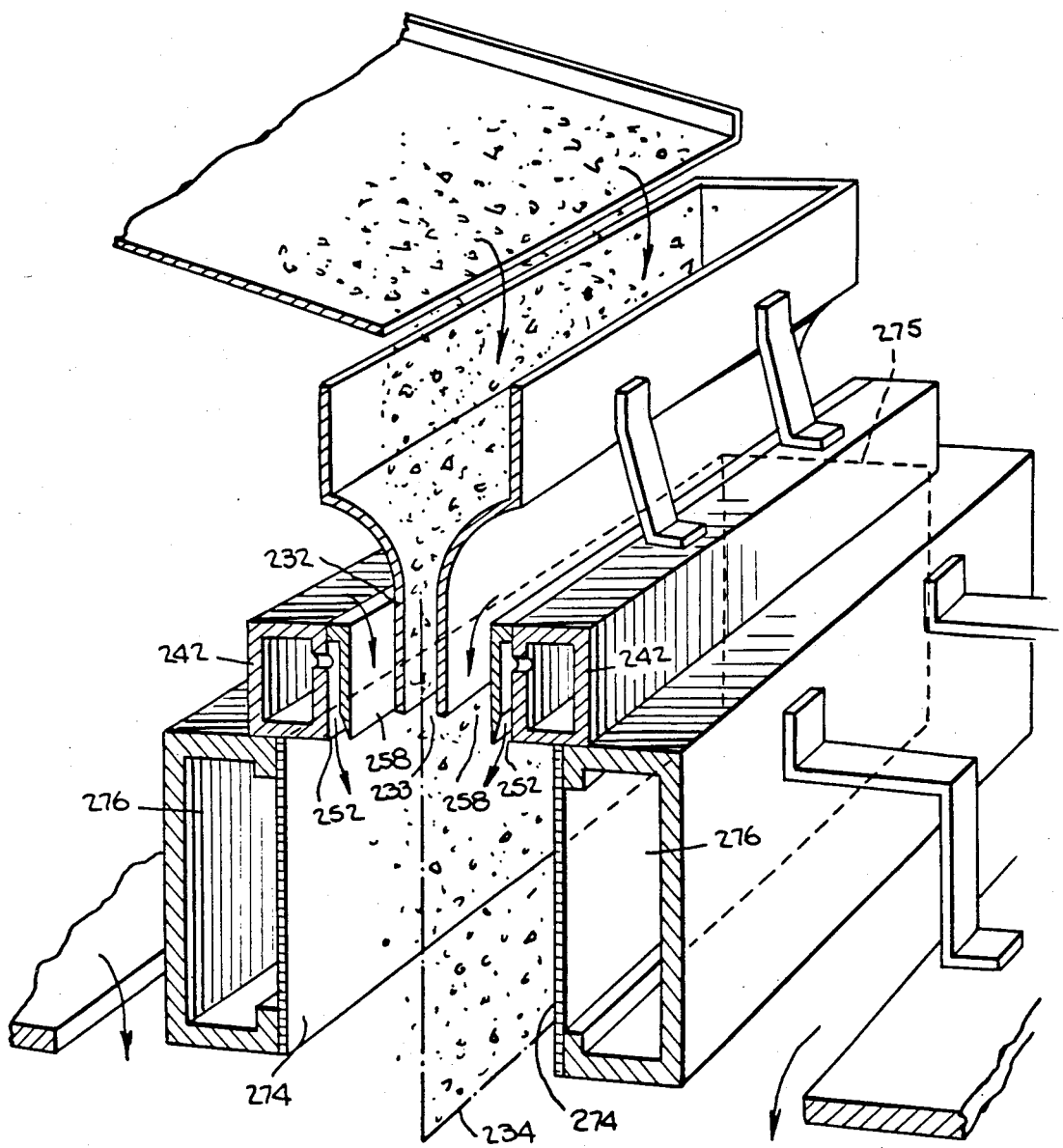
FIG. 4 is a fragmentary schematic perspective view of apparatus according to a third embodiment of the present invention.

The apparatus described above incorporates a circular feed orifice to provide a particle stream of circular cross-section and a diffuser in the form of a surface of revolution about an axis aligned with the feed orifice to provide radial flow of aqueous gas toward the axis of the stream. It is believed that the combination of a circular particle stream and radial gas flow provides optimum confinement of the particulate stream by the inwardly-flowing steam. However, other shapes may also be employed. The nozzle assembly illustrated in FIG. 4 incorporates a feed tube 232 of rectangular cross-section defining an elongated, slot-like feed orifice 233. A curtain-like stream of particulate material is discharged downstream along a path in plane 234. A pair of elongated steam manifolds 242, each having an elongated, slot-like steam nozzle or orifice 252, extend on opposite sides of the feed orifice, parallel to its long axis. Steam discharged through these orifices passes downstream, and draws in cooling air through a pair of elongated gaps 258 between the nozzles and the feed tube.

The diffuser includes a pair of long flat porous plates 274 disposed on opposite sides of plane 234 and a pair of short porous plates 275, of which only one is shown, extending between the long plates at opposite ends thereof. The porous plates cooperatively define a rectangular tube surrounding the particle path on all sides. Steam discharged through the long plates flows inwardly towards the wide faces of the particle stream, whereas steam discharged through the short plates flows inwardly towards the margins of the stream.

The diffuser need not have microscopic pores or perforations as described above. A satisfactory but less preferred diffuser may incorporate discrete, visible perforations. As used in this disclosure, the term "diffuser" means a body having a perforated or porous surface with pores or perforations so closely spaced that steam issuing through the pores or perforations merges adjacent the surface of the body into a substantially continuous flux moving in the direction normal to the surface. Satisfactory diffusers can be fabricated from fine woven wire mesh.

Figure 5:
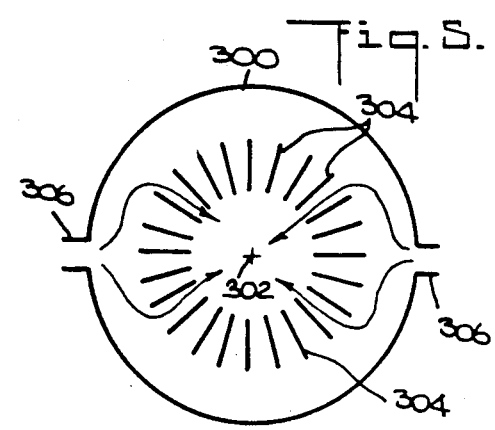
FIG. 5 is a fragmentary schematic view of apparatus according to a fourth embodiment of the present invention.

Preferably, the steam supplied to the moistening chamber is saturated steam. Superheated steam is less preferred inasmuch as it typically provides a lesser moistening effect. Wet steam, which is a mist of fine water droplets in saturated steam, may be used. Other aqueous gases, comprising mists of microscopic water droplets dispersed in gases other than steam, may also be employed. A mist may be supplied to the moistening chamber with the desired flow pattern by directing the mist into the moistening chamber through appropriate ducting. For example, the apparatus schematically illustrated in FIG. 5 includes an annular shell 300 having an axis 302 and a plurality of radially-extensive vanes 304. The stream of particulate material is passed into the moistening chamber along axis 302. Mist introduced into the shell adjacent its periphery via inlets 306 passes radially inwardly between the vanes, and flows radially inwardly toward axis 304. Thus, the stream of particulate material is surrounded by mist or aqueous gas flowing inwardly towards the axis.

Water-soluble particulate materials other than coffee may be agglomerated by procedures according to the present invention. As used in this disclosure, the term "water-soluble particulate material" refers to a particulate material which will form a flowable phase upon moistening, regardless of whether such flowable phase is a true solution, and regardless of whether the flowable phase includes all constituents of the material. Among the materials which can be agglomerated are soluble tea, soluble chicory powder, soluble barley powder, skim milk powder and cocoa-based beverage mixes. Combinations of such materials may also be agglomerated.

The apparatus described above may also be used to darken the materials mentioned above and other hygroscopic pulverulent materials, without significant agglomeration. Solid, unitary granules of the material are directed through the feed tube of the nozzle assembly and exposed to the cloud of steam, thereby moistening and darkening the exterior surface of each granule. The moistened granules are then dried. Granules treated in this fashion typically are much larger than the minute particles fused in the agglomeration process described above. Indeed, the granules may be agglomerates resulting from the agglomeration process.

Darkening techniques according to this aspect of the present invention utilize steam or other aqueous gasses efficiently in achieving the desired darkening effect. The aqueous gas forming the quiescent cloud at the particle path does not impart any appreciable velocity to the granules projected through the cloud. Accordingly, the supply of aqueous gas and hence the moisture content of the cloud may be increased as required to achieve the desired degree of darkening without affecting the residence time of granules in the cloud. By contrast, only a limited darkening effect can be achieved with techniques using only a jet of steam from a nozzle. Attempts to increase the darkening effect by increasing the steam flow in such a jet become self-defeating; the increased steam flow impels the granules at greater velocities and hence reduces the residence time of the granules in the steam.

In one embodiment of the present invention, an agglomeration process as described above is adjusted to produce fused but relatively light colored agglomerates. Some of those agglomerates are then passed through a darkening operation as described, then blended back with the light colored agglomerates to provide a product of variegated appearance. The nozzle assemblies employed for the agglomeration and darkening operations may feed into the same drying chamber. Thus, the material passing out of the drying chamber will be a blend of darkened and undarkened agglomerates. The outlet of the fragmentizer may be connected to the darkening nozzle assembly so that only the pieces resulting from fragmentation of oversized agglomerates will be fed back through the darkening operation. As oversized agglomerates are produced only in the agglomeration operation and not in the darkening operation, the material recycled to the darkening operation will not include previously darkened material.

Certain aspects of the present invention are illustrated by the following examples:

EXAMPLE 1

A spray-dried coffee extract powder is pulverized to 24 micron mean particle size, conveyed in air to a cyclone collector and transferred from the cyclone collector into an auger feeder. The auger forces the powder through an orifice at the rate of about 0.35 kg per minute per $cm^2$ of orifice cross-sectional area. The powder exits from the orifice in the form of a solid stream which breaks into chunks as it falls into the feed tube of the agglomeration nozzle assembly.

The nozzle assembly is similar to that illustrated in FIG. 2, but there is no gap between the annular steam orifices and the feed tube, so that the inner annular steam orifice immediately surrounds the feed tube. Also, the aspirator ring is omitted. The diffuser is a porous collar having 1 micron pores. Steam under about 750 to 1500 Pa pressure is fed through the annular steam orifices at about $1.28\times10^3$ to $2.1\times10^3$ kg per minute per square meter of orifice area. Steam under about 17 kPa pressure is applied to the exterior of the porous collar and diffuses through it at the rate of about 13.3 kg per minute per square meter of diffuser area.

As they pass through the cloud of steam within the collar, the chunks are converted to agglomerates. The agglomerates pass into an initial drying chamber where they encounter warm, dry air and are partially dried adjacent their surfaces. The agglomerates pass from this chamber into a fluidized bed where they are further dried to a final moisture content of about 3.2%. The dried agglomerates pass to a sifter equipped with a 1.68 mm top screen and a 595 micron bottom screen. The oversize agglomerates are directed to a fragmentizer and then back into the sifter, whereas undersize pieces are recycled to the pulverizer.

The product recovered between the top and bottom screens consists principally of sharp edged pieces having shapes similar to the particles of roast and ground coffee. The product has a pleasing dark color with light speckles resembling in appearance the light colored speckles found in roast and ground coffee.

EXAMPLE 2

As the steam pressure applied to the porous collar in the method of Example 1 is progressively decreased to 7 kPa and the steam flow through the porous collar is correspondingly decreased to about 6.7 kg per minute per square meter of diffuser area, the product becomes progressively lighter and the density of the product progressively decreases, demonstrating the results of progressively lower degrees of moistening. As the steam pressure applied to the porous collar is progressively increased to about 21 kPa resulting in an increase in steam flow through the porous collar to about 19 kg per minute per square meter of diffuser area, the product becomes progressively darker with increased density and particles having sharper edges, demonstrating the results of greater moistening.

EXAMPLE 3

Spray dried soluble coffee is processed in accordance with Example 1 except that the powder is only pulverized to about 50 micron mean particle size. The product has a spongy, uniformly darkened appearance; it does not have a sharp-edged, flake-like appearance.

EXAMPLE 4

A mixture of chicory extract is dried to powder form by spraying it into a drying tower cocurrently with air at a dry bulb temperature of about 370° C. The resulting powder is captured and pulverized to a mean particle size of about 40 microns. The pulverized powder is fed through an auger-type feeder having an unrestricted discharge, into a vibratory feeder. The powder passes from the vibratory feeder through an agglomeration nozzle similar to that illustrated in FIG. 2, back into the same drying chamber as used in drying the liquid extract so that both agglomerates and atomized liquid extract are dried simultaneously. The diffuser is a porous collar having 5 micron nominal pore openings. Steam is supplied to the annular orifices under a pressure of about 3 kPa and to the porous collar at about 37 kPa. Air is supplied through an aspirator ring disposed downstream of the porous collar at about 0.04 m$^3$/min.

The mixture of dried agglomerates and powder particles exiting the dryer is directed to a sieving device equipped with a 2.38 mm top screen and a 707 micron bottom screen. The sieving device is equipped with an internal breaker for fragmenting oversize agglomerates until they pass through the top screen. Fine pieces and powder particles from the spray-drying operation pass through both screens and are returned to the pulverizer. The product retained between the top and bottom screens has a sharp edged, flake-like appearance similar to roast and ground coffee particles, a dark color with some light colored portions, and a bulk density of 25.0 gm/dl.

EXAMPLE 5

Unitary granules of freeze-dried soluble coffee about 2 millimeters in size are passed into a drying chamber through a nozzle assembly similar to that illustrated in FIG. 2 save that the aspirator ring is omitted. Steam diffuses inwardly through a porous collar at the rate of about 2.1 kg per minute per square meter of diffuser area. Additional steam flows downstream through annular orifices surrounding the feed tube. The granules initially have a light tan color and a bulk density of about 23.2 gm/dl. After passage through the nozzle assembly and dryer, the granules have an extremely dark brown color corresponding to that of the darkest conventional roasted coffee powders and a bulk density of about 25.5 gm/dl. Total steam consumption in the darkening operation amounts to 0.42 kg of steam per kg of granules treated.

EXAMPLE 6

A spray dried coffee extract powder is pulverized to 31 micron means particle size and passed to the feed tube of the agglomeration nozzle via a screw feeder having an unrestricted discharge and a vibratory feeder. The powder does not form chunks to any appreciable extent before entering the agglomeration nozzle.

The nozzle assembly is similar to that illustrated in FIG. 2, save that the aspirator ring is omitted. The diffuser has 5 micron nominal pore openings. Steam under about 1 kPa pressure is fed through the annular steam orifices surrounding the feed tube at about 2.0×10$^3$ kg per minute per square meter of orifice area. Steam under about 33 kPa pressure is applied to the exterior of the diffuser and passes through it at a rate of 45 kg per minute per square meter of diffuser area.

As it passes through the cloud of steam within the diffuser, the powder is agglomerated. The agglomerates are dried and then passed into a sifter equipped with 2.38 mm top screen and 707 micron bottom screen. Oversized agglomerates are fragmented and returned to the sifter whereas undersize material is returned to the pulverizer. The product recovered between top and bottom screens has a sharp-edged, flake-like appearance resembling the freeze-dried instant coffee.

EXAMPLE 7

(Comparison Example)

The procedure of Example 6 is repeated using the same powder and the same agglomeration nozzle, save that the porous collar is omitted. Steam is applied only through the annular steam orifices at a rate of 2.0×10$^3$ kg per minute per square meter of orifice area. Thus, the agglomeration procedure is not in accordance with the present invention.

The product has a spongy, uniformly darkened appearance rather than the sharp-edged, flake-like appearance obtained in Example 6. With the same powder feed rate as used in Example 6, the product output is only about half of that obtained in Example 6; a lesser proportion of the powder is converted to the agglomerates in the desired size range than in Example 6.

EXAMPLE 8

A spray dried tea extract is pulverized to about 40 micron mean particle size and agglomerated using the same equipment as employed in Example 6. The powder feed rate to the agglomeration nozzle is about 65% of that employed in Example 6. The steam pressures are adjusted to provide flow rates of about 1.6×10$^3$ kg per minute per square meter of orifice area and about 26 kg per minute per square meter of diffuser area. In other respects, the process is the same as used in Example 6. The product has a sharp-edged, flake-like appearance and a bulk density of 21 gm/dl.

EXAMPLE 9

A mixture of cocoa powder, sugar, lecithin and flavors is pulverized in a hammer mill equipped with a discharge screen having perforations of about 3 mm diameter. The pulverized material has a broad particle size distribution and includes both fine particles of cocoa and large particles of sugar having a characteristic light color. The pulverized material is fed to the agglomeration nozzle at about 65% of the powder feed rate used in Example 6. Steam pressures are selected to provide flow rates of about 2.9×10$^3$ kg per minute per square meter of orifice area and about 36 kg per minute per square meter of diffuser area. The sifter has a top screen with 1.19 mm openings and no bottom screen; all of the material passing through the top screen is removed from the system as product. In other respects, the process is the same as used in Example 6. The product has a very dark color. The light-colored sugar particles are coated with cocoa, indicating that fine cocoa particles have been agglomerated with the sugar particles.

EXAMPLE 10

A spray dried barley extract powder is pulverized to about 35 micron mean particle size and fed through an agglomeration nozzle assembly having only one annular steam orifice, no annular gap between the steam orifice and the feed orifice, a cylindrical diffuser with 1 micron pores and no aspirator ring. There is no appreciable chunk formation prior to the moistening step. Steam flow rates of about $4.5 \times 10^3$ kg per minute per square meter of orifice area and about 15.6 kg per minute per square meter of diffuser area are employed in the moistening step. The agglomerates produced in the moistening step are dried and sifted using a 2.38 mm top screen and a 707 micron bottom screen. Oversized pieces are discarded rather than fragmented, and undersized pieces are also discarded. The product collected between the top and bottom screens has a sharp-edged, flake-like appearance.

EXAMPLE 11

A non-fat milk powder with a mean particle size of about 35 microns is fed, without appreciable preliminary chunk formation, to an agglomeration nozzle assembly similar to that illustrated in FIG. 2 but without an aspirator ring, and having a diffuser with 5 micron pores.

Steam is supplied to the annular orifices under a pressure of about 1.5 kPa and to the porous collar at about 42 kPa. The agglomerates formed in the nozzle assembly are dried and sifted with a 3.36 mm top screen and a 707 micron bottom screen.

Oversized agglomerates are returned to the sifter and fragmented in the sifter, whereas undersized particles are segregated for rework. The product retained between the screens is composed of pieces of irregular shape, has a bulk density of 10 gm/dl and disperses readily in hot water.

What is claimed is:

1. Apparatus for agglomerating particles of a water-soluble particulate material comprising:
    (a) a vertically extending confining moistening chamber having an inlet of lesser cross-section width than the width of the confines of the chamber and an outlet vertically disposed from the inlet;
    (b) means associated with the inlet for projecting a stream of particulate material into the chamber to the outlet;
    (c) means for diffusing aqueous gas horizontally inwardly from outside and about the periphery of the vertical confines of the chamber to surround and tend to confine, under relatively quiescent conditions, a stream of particulate material projected through the chamber from the inlet to the outlet; and
    (d) means associated with the outlet for receiving and drying particulate material from the outlet of the chamber.

2. Apparatus as claimed in claim 1, wherein the moistening chamber is circumscribed by an outer confining wall and the means for diffusing aqueous gas is a vertically extensive porous tubular shell of substantially uniform porosity which is disposed from the wall to define an annular channel between the wall and the shell.

3. Apparatus as claimed in claim 2, further comprising means for supplying aqueous gas to the exterior surface of the tubular shell at a substantially uniform pressure about the circumference of the shell.

4. Apparatus as claimed in claim 1, further comprising means, associated with the inlet, adjacent to and about the periphery of the means for projecting particulate material, for projecting steam adjacent to and about a stream of projected particulate material.

5. Apparatus as claimed in claim 1, further comprising means, associated with the inlet, adjacent to and about the periphery of the means for projecting particulate material, for projecting a cooling gas adjacent to and about the periphery of a stream of projected particulate material.

6. Apparatus as claimed in claim 1, wherein the particles of the particulate material are formed into chunks which are projected as a particulate material stream.

7. Apparatus as claimed in claim 1 or claim 6, further comprising means for fragmenting at least some of the dried particulate material positioned after the drying means.

8. Apparatus as claimed in claim 4 further comprising means, associated with the inlet, between the means for projecting particulate material and the means for projecting steam, for projecting a cooling gas adjacent to and between a stream of projected particulate material and a stream of projected steam.

9. Apparatus as claimed in claim 4 wherein the means for projecting particulate material includes an orifice, associated with the inlet, and the means for projecting steam includes an orifice, associated with the inlet, adjacent to and surrounding the particulate material projecting orifice.

10. Apparatus as claimed in claim 5, wherein the means for projecting particulate material includes an orifice, associated with the inlet, and the means for projecting cooling gas includes an orifice, associated with the inlet, adjacent to and surrounding the particulate material projecting orifice.

11. Apparatus as claimed in claim 8, wherein the means for projecting particulate material includes an orifice, associated with the inlet, and the means for projecting cooling gas includes a first annular orifice, associated with the inlet, adjacent to and surrounding the particulate material projecting orifice and the means for projecting steam includes a second annular orifice, associated with the inlet, adjacent and surrounding the cooling gas projecting orifice.

12. Apparatus for agglomerating particles of a water-soluble particulate material comprising:
    (a) a confining moistening chamber having a vertically extensive porous tubular shell of substantially uniform porosity disposed from an outer confining wall such that an annular channel is defined between the outer wall and the shell;
    (b) an upper inlet in the moistening chamber having a lesser cross-section width than the confines of the moistening chamber shell;
    (c) a lower outlet in the moistening chamber vertically disposed from the inlet;
    (d) means for supplying an aqueous gas to the exterior surface of the tubular shell at a substantially uniform pressure about the circumference of the shell;
    (e) means for projecting an annular stream of particulate material into the moistening chamber through the inlet to the outlet; and
    (f) means for receiving particulate material from the outlet and for drying the received particulate material.

13. Apparatus as claimed in claim 12, further comprising at least one annular orifice, adjacent to and surrounding the means for projecting particulate material, associated with means for projecting a gas selected from the group consisting of a cooling gas and steam.

14. Apparatus as claimed in claim 12, further comprising an annular orifice, adjacent to and surrounding the means for projecting particulate material, associated with means for projecting steam.

15. Apparatus as claimed in claim 12, further comprising an annular orifice, adjacent to and surrounding the means for projecting particulate material, associated with means for projecting a cooling gas.

16. Apparatus as claimed in claim 15, further comprising a second annular orifice, adjacent to and surrounding the orifice for projecting cooling gas, associated with means for projecting steam.

* * * * *

UNITED STATES PATENT AND TRADEMARK OFFICE
CERTIFICATE OF CORRECTION

PATENT NO. : 4,724,620

DATED : February 16, 1988

INVENTOR(S) : Sheng-Hsiung Hsu

It is certified that error appears in the above-identified patent and that said Letters Patent is hereby corrected as shown below:

Column 5, line 9, "29" should be --28--.

Column 15, line 31, "10 gm/dl" should be --19 gm/dl--.

Signed and Sealed this

Eighth Day of November, 1988

Attest:

DONALD J. QUIGG

*Attesting Officer*  *Commissioner of Patents and Trademarks*